(12) United States Patent
Clark et al.

(10) Patent No.: US 7,477,902 B2
(45) Date of Patent: Jan. 13, 2009

(54) CAPACITY ALLOCATION IN A WIRELESS COMMUNICATION SYSTEM

(75) Inventors: Andrew C. Clark, Succasunna, NJ (US); Eric H. Grosse, Berkeley Heights, NJ (US); Mark H. Kraml, Flanders, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 412 days.

(21) Appl. No.: 11/238,845

(22) Filed: Sep. 29, 2005

(65) Prior Publication Data

US 2007/0072645 A1  Mar. 29, 2007

(51) Int. Cl.
*H04Q 7/20* (2006.01)
(52) U.S. Cl. .................. 455/453; 455/422.1; 455/522; 455/450; 455/445
(58) Field of Classification Search .............. 455/453, 455/422.1, 522, 450, 445
See application file for complete search history.

(56) References Cited

U.S. PATENT DOCUMENTS

| 5,715,245 | A | 2/1998 | Suonvieri | |
| 6,571,110 | B1* | 5/2003 | Patton et al. | 455/561 |
| 6,650,876 | B1* | 11/2003 | Ostman et al. | 455/103 |
| 6,735,451 | B1* | 5/2004 | Jarleholm et al. | 455/561 |
| 6,925,059 | B2* | 8/2005 | Feli et al. | 370/235 |
| 7,085,560 | B2* | 8/2006 | Petermann | 455/422.1 |
| 7,190,958 | B1* | 3/2007 | Yarkosky | 455/436 |
| 2003/0054843 | A1* | 3/2003 | Notani et al. | 455/466 |

FOREIGN PATENT DOCUMENTS

| EP | 1178384 A1 | 2/2002 |
| EP | 1414194 A1 | 4/2004 |
| EP | 1096817 A1 | 7/2007 |
| WO | WO 02069665 * | 9/2002 |

OTHER PUBLICATIONS

International Search Report and Written Opinion of the International Searching Authority for International application No. PCT/US2006/036840, mailed Jan. 31, 2007.
Ericsson TLC Spa et al: "N+M radio sector flexible redundancy for Point-to-Multipoint systems" Research Disclosure, Mason Publications, Hampshire, GB, vol. 421, No. 78, May 1999, XP007124337, ISSN: 0374-4353, paragraphs [0001]-[0004].

* cited by examiner

*Primary Examiner*—Sanh D Phu

(57) ABSTRACT

A wireless communication system (20) includes a capacity allocation module (35) that adjusts an allocation of an authorized total capacity among a plurality of base stations (22, 24, 26). A disclosed example includes determining a peak capacity requirement for a plurality of base stations at any given time. An authorized capacity corresponds to the peak requirement for the plurality of base stations. The disclosed example includes adjusting an allocation of the authorized total capacity among the plurality of base stations to meet different traffic requirements at each of the base stations at different times.

11 Claims, 2 Drawing Sheets

CAPACITY ALLOCATION IN A WIRELESS COMMUNICATION SYSTEM

FIELD OF THE INVENTION

This invention generally relates to telecommunications. More particularly, this invention relates to wireless communication systems.

DESCRIPTION OF THE RELATED ART

Wireless communication systems are well known and in widespread use. Typical systems include a plurality of base stations, sometimes referred to as nodes, strategically located to provide wireless communication coverage around a selected geographic area. Each base station includes hardware and software components that facilitate operation of the base station in a known manner. Designing a wireless communication system typically includes estimating a call handling or traffic capacity for each base station and providing sufficient hardware capacity to meet those needs. There are several limitations with the traditional approach.

Typical base station arrangements have hardware components with an potential capacity that exceeds the amount required for that node. In many instances, the hardware components are strategically enabled so that only some of the potential capacity is made available for use at that base station. The supplier of the hardware components typically controls how the hardware is enabled, which dictates how much capacity is enabled and available for use at a base station. This situation introduces some economic inefficiencies because there are unused resources.

From a wireless service provider's standpoint, base stations typically have to be over-designed so that they can meet the peak capacity requirements at that node. For example, some base stations are in geographic locations that experience wide fluctuations in traffic volumes. A base station that serves a sector including a business district, for example, experiences high traffic volumes during normal business hours but very light traffic volumes during late evening hours, for example. The base station serving that sector typically has enough enabled hardware capacity to handle the peak traffic load. Much or all of that same hardware capacity goes unused for many hours of the night (or day) when the traffic load is significantly lower. Another example includes a base station that serves a sector including a sports stadium or a theater district. Such a base station typically experiences low traffic volumes other than at times corresponding to a major sporting event or the evening hours in a theater district, for example. Again, such a base station typically has enabled hardware capacity sufficient for meeting the peak traffic needs. That capacity goes largely unused most of the time, however.

It would be advantageous to hardware suppliers and wireless service providers to be able to customize how the base station capacity is utilized to avoid unused resources.

There is a need for a strategy to better use capacity of resources in wireless communication systems.

SUMMARY OF THE INVENTION

This invention provides a unique arrangement of wireless communication system capacity that is adjustable to meet traffic volume needs while avoiding unused resources.

One exemplary base station includes at least one operative component that is selectively enabled to provide an enabled call handling capacity for the base station. An authorization module controls use of the enabled capacity such that a first amount of the enabled capacity is authorized for use if a first condition exists and a second, different amount of the enabled capacity is authorized for use if a second, different condition exists.

In one example, the authorized capacity at the base station is based on an allocation of a total capacity among a plurality of nodes in a wireless communication system. In one example, a first one of the nodes has a first portion of the total capacity allocated to it if a first condition exists. If a second conditions exists, the first node has a second, different portion of the total capacity allocated to it.

One exemplary wireless communication system includes a capacity allocation module that selectively allocates portions of a total authorized capacity among a plurality of base stations that each having an enabled capacity. The capacity allocation module allocates a first authorized portion of the total capacity to at least one of the base stations if a first condition exists and a second, different authorized portion of the total capacity to that base station if a second condition exists.

In one example, the capacity allocation module increases the allocated capacity for one node while decreasing the allocated capacity for at least one other node such that the total allocated capacity among the plurality of nodes stays within an authorized total capacity limit. Such changes are dictated by preselected license terms in one example. In another example, the changes are dynamically made responsive to changes in traffic load conditions at one or more of the base stations.

One example includes changing the total authorized capacity to provide even further customization.

The various features and advantages of this invention will become apparent to those skilled in the art from the following detailed description. The drawings that accompany the detailed description can be briefly described as follows.

DETAILED DESCRIPTION

Figure 1:
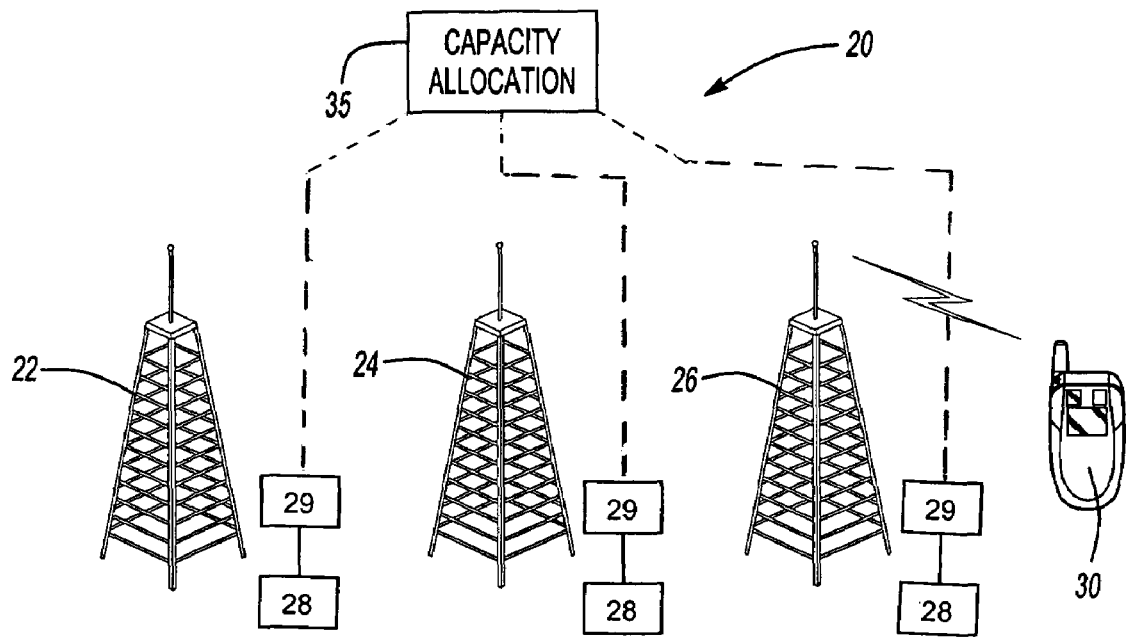
FIG. 1 schematically illustrates selected portions of a wireless communication system designed according to an embodiment of this invention.

FIG. 1 schematically shows selected portions of a wireless communication system 20. A plurality of base stations 22, 24 and 26 operate as nodes of the wireless communication system 20 in a known manner. Each base station, for example, is positioned to provide wireless communication coverage for a selected geographic area or cell. The base stations 22, 24 and 26 serve as nodes for enabling mobile stations 30 to communicate through the communication system 20.

Each example base station includes operative components 28 that facilitate wireless communications. One example component is a channel card having physical channel elements that define or control how much capacity the base station has for processing wireless communications (e.g., how many users or mobile stations 30 the base station can support). The example components 28 have a potential capacity based on the hardware design. In one example, each base station has an enabled capacity based on how the components 28 are configured or enabled prior to or during installation, for example. In many instances, the enabled capacity is less than the potential capacity.

Operation of each base station depends on an authorization such as that in a license agreement controlling use of the components 28. Each base station is limited to operate at the maximum authorized capacity, which may be less than the enabled capacity. In the illustrated example, the base stations 22, 24 and 26 each have a variable authorized capacity that can be changed in a preselected manner or dynamically responsive to the needs of a particular situation. The illustrated example base stations include authorization modules 29 that control how much of the capacity at each base station is authorized at a given time. In one example, the authorization modules 29 comprise software that utilize information regarding a license agreement controlling the authorized capacity at the base station, for example, for controlling the use of the enabled capacity at that base station. Given this description, those skilled in the art will realize how to program or design an authorization module to meet their particular needs.

One example includes selecting an enabled capacity for each of the base stations to meet the peak needs at that base station but strategically authorizing only portions of the enabled capacity to meet expected or actual needs under different circumstances. In some examples, a total or aggregate enabled capacity for a plurality of base stations will exceed the typical aggregate need across the base stations. As described below, the authorized capacity can be strategically allocated among the base stations to meet the needs of a variety of circumstances without using the total enabled (or potential) capacity at all of the base stations at once. A total or aggregate authorized capacity can therefore be selected to meet the highest capacity needs at each of the base stations without requiring a service provider to pay a license fee for the entire enabled capacity at each of the base stations all of the time. Instead, a strategic allocation of authorized capacity allows for avoiding over-designing a wireless communication system.

In examples where the authorized capacity is preselected and fixed, the authorization module 29 is programmed to control the authorized capacity in a preselected manner (e.g., setting the authorized capacity based on time of day or day of the week) without requiring any further input after installation, for example. In examples, where an allocation of the authorized capacity among a plurality of base stations can be dynamically adjusted, each authorization module 29 responds to a controller within a switching center such as an executive cellular processor, which dictates how the authorized capacity is allocated to each base station.

The illustrated example includes a capacity allocation module 35 that facilitates adjusting the authorized capacity at any one or all of the example base stations. In one example, the capacity allocation module 35 facilitates communicating a change in a licensed authorized capacity to the appropriate authorization module(s) 29 so that the proper amounts of enabled capacity are available to facilitate wireless communications.

In one example, the capacity allocation module adjusts an allocation of an authorized aggregate or total capacity among the base stations 22, 24 and 26. The example allocation module 35 is shown schematically for discussion purposes. In some examples, the allocation module 35 comprises hardware, software, firmware or a combination of them. In some examples, the allocation module 35 is centrally located within a mobile switching center or an executive cellular processor while in other examples, it is a distributed algorithm. Given this description, those skilled in the art will realize how to select and arrange components or functionality within a wireless communication system to meet the needs of their particular situation while achieving the benefit afforded by the example allocation module 35.

In one example, operation of the system 20 includes strategically allocating authorized capacity to various base stations or nodes within the network such that the capacity at each base station or node is adjustable to meet varying needs under different conditions.

Figure 2:
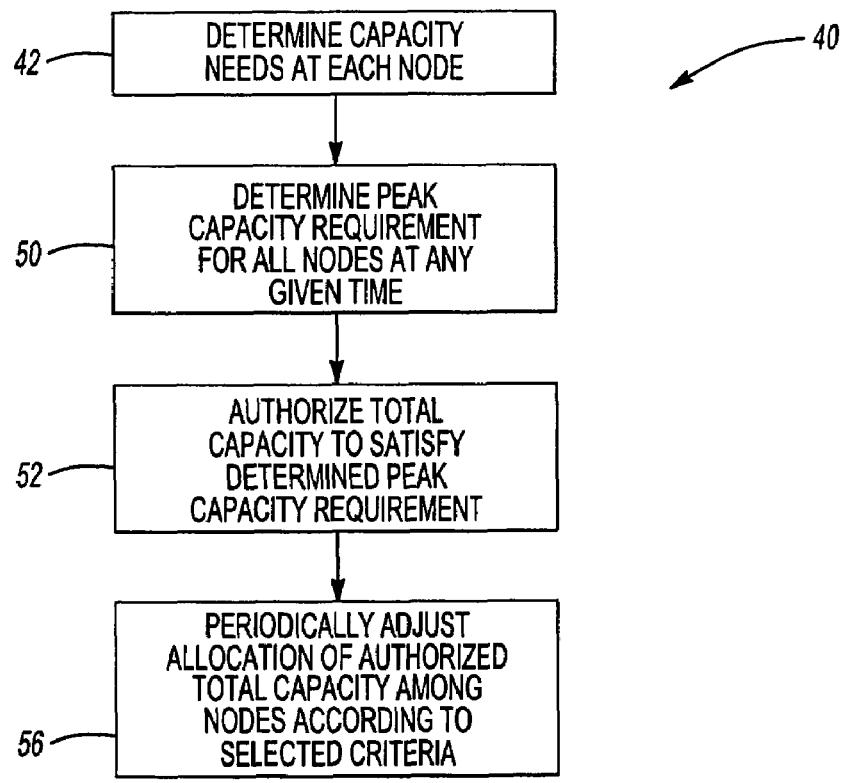
FIG. 2 is a flowchart diagram summarizing one example approach useful in an embodiment of this invention.
Figure 3:
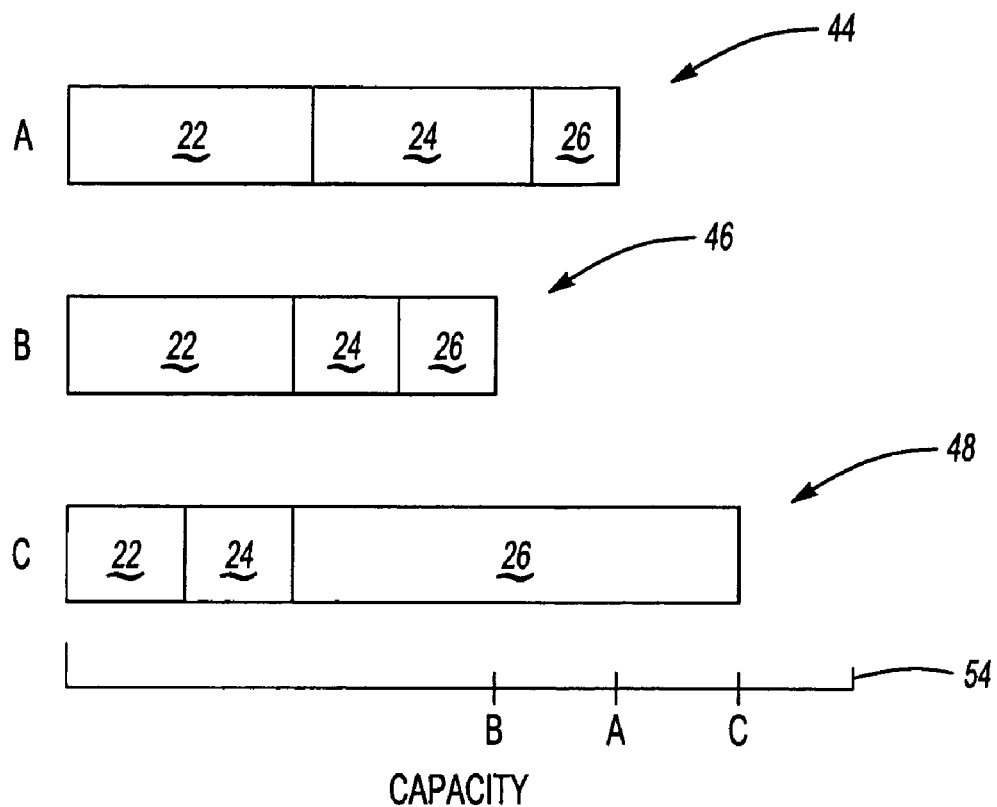
FIG. 3 schematically illustrates capacity requirements in one example system.

FIG. 2 includes a flow chart diagram 40 summarizing one example approach. At 42, a determination is made regarding the capacity needs at each base station. FIG. 3 graphically shows how the capacity requirements for different nodes may vary at varying times or during different conditions and schematically illustrates one example approach. A first condition A at 44 includes traffic volumes at each of the base stations resulting in capacity requirements as schematically shown. The condition A in FIG. 3 corresponds to the base stations 22 and 24 each having a higher traffic volume and resulting capacity need that exceeds that at the base station 26. The condition A may correspond, for example, to normal business hours and the base stations 22 and 24 serve sectors or cells that include a business district. The base station 26 may serve a sector or cell that does not experience much traffic during normal business hours.

A different condition B is shown at 46. Under this condition, which may correspond to another time of day, for example, the capacity requirement at the base station 22 exceeds that of the base stations 24 and 26. Under this condition, the capacity need at the base station 24 is significantly less than it was at 44 during condition A.

Another condition C is shown at 48, which may correspond to an evening sporting event where the base station 26 serves a cell or sector including a sports stadium. The capacity requirement for the base station 26 under the condition C far exceeds that under the conditions A and B. At the same time, the capacity requirement for the base station 26 during the condition C far exceeds the capacity requirements of the base stations 22 and 24. The capacity requirements for the base stations 22 and 24 under the condition C are both far less than condition A, for example.

The approach summarized in FIG. 2 includes determining a peak capacity requirement for all nodes at any given time at 50. Referring to FIG. 3, the total capacity requirement for the conditions A, B and C are shown near the bottom of FIG. 3. The condition C represents the peak total capacity required for the base stations 22, 24 and 26 for all of the considered conditions A, B and C.

One example includes authorizing a total capacity for all three base stations 22, 24 and 26 together to satisfy the determined peak capacity requirement. This is shown at 52 in FIG. 2, for example. Authorizing a total capacity in this manner by considering a plurality of nodes in the aggregate, rather than just considering each node individually, allows for more strategically allocating wireless communication system resources. In the example of FIG. 3, the total authorized capacity is set at 54, which is greater than the capacity required under the condition C. This provides some buffer to accommodate unexpected increases in traffic loads, for example.

In one example, one or more of the base stations has a preset range within which the authorized capacity can be varied for that base station. This allows for maintaining some limit on a minimum and a maximum allocation at any given base station, if desired.

The disclosed example includes adjusting the allocation of the authorized total capacity among the nodes according to selected criteria. This is shown at 56 in FIG. 2, for example. The authorized total capacity in one example is distributed or allocated among the plurality of nodes such that each node has a capacity corresponding to an expected traffic load for the current condition such as the current time of day. One example includes setting a schedule for how the authorized total capacity is allocated among the nodes. Another example includes dynamically adjusting the allocation of the authorized capacity by monitoring traffic loads at each of the base stations and adjusting the authorized allocation for each base station to track the current traffic volumes. Such an approach provides more assurance that each base station will have sufficient allocated authorized capacity to satisfy current traffic needs.

For example, the allocation pattern for the condition A in FIG. 3 includes allocating more of the total authorized capacity to the base stations 22 and 24 than to the base station 26. The allocation pattern for the condition C includes a significantly increased allocation for base station 26.

One example includes changing the authorized total capacity to meet different needs. Considering FIG. 3 as an example, the peak traffic need corresponds to the condition A for most days if the base station 26 serves a sector or cell including a sports stadium, for example. The peak need corresponding to the condition C may only rarely occur in some instances. One example includes authorizing a total capacity for the base stations corresponding to the requirements of a traffic load during the condition A as a first authorized total capacity. Selected times of year or selected days may have a different, higher total authorized capacity to accommodate the other condition C, for example. Depending on the particular scenario, a wireless service provider may be able to predict when the traffic load will be within a normal expected peak load for a given set of base stations and when an unusually high traffic load may be experienced. Some such scenarios lend themself to customizing the authorized total capacity along with customizing the allocation of the authorized total capacity among the base stations that share the authorized capacity.

Figure 4:
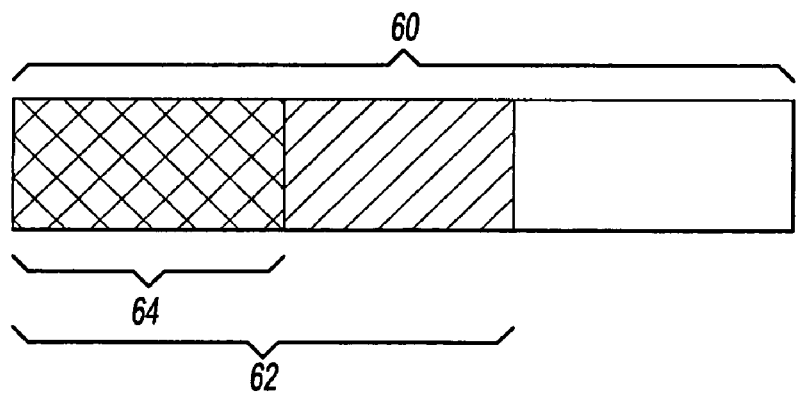
FIG. 4 schematically illustrates controlled capacity usage in one example embodiment.

FIG. 4 schematically illustrates one example way of controlling the use of hardware capacity at an example base station. A potential capacity is shown at 60 which corresponds to the maximum capacity of the components 28. In this example, a wireless service provider determines that it is only desirable to have less than the potential capacity 60 enabled at a particular base station. The hardware supplier in this example enables a corresponding portion of the potential capacity 60. FIG. 4 schematically shows an enabled portion of the capacity at 62.

Utilizing a strategic allocation of authorized capacity as described above during one condition results in an authorized portion 64 of the capacity that is less than the enabled portion 62.

The enabled portion 62 in one example corresponds to an expected peak usage at that base station. The peak usage at each base station may change from time-to-time and the peak at each base station may never overlap with a peak at another base station. Accordingly, the total enabled capacity of all related base stations typically will exceed the total authorized capacity. Additionally, each base station typically may be allocated a portion of the authorized total capacity that is less than the enabled capacity at that base station. Preselected criteria control how the authorized capacity is determined and allocated. Such a strategy for controlling use of capacity at a base station in a wireless communication system provides more strategic control over how resources are used and how contracts for such use can be arranged.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:
1. A wireless communication system, comprising:
a capacity allocation module that selectively allocates portions of a total authorized capacity among a plurality of base stations each having an enabled capacity, the capacity allocation module allocates a first authorized portion of the total capacity to at least one of the base stations if a first condition exists and a second, different authorized portion of the total capacity to the at least one base station if a second condition exists;
the plurality of base stations each having an authorization module that controls an authorized amount of the enabled capacity at the corresponding base station, each authorization module responding to an indication from the capacity allocation module indicating how much of the enabled capacity is to be authorized for at least one of the conditions, wherein a total of the enabled capacity at each of the base stations exceeds the total authorized capacity and the capacity allocation module authorizes use of less than the enabled capacity of at least one of the base stations such that the authorized capacity of the entire plurality of base stations is within the total authorized capacity.

2. The system of claim 1, wherein at least one of the first or second authorized capacities is less than the enabled capacity at the at least one base station.

3. The system of claim 1, wherein the capacity allocation module comprises a portion of an executive cellular processor.

4. The system of claim 1, wherein the capacity allocation module comprises a portion of a switching center.

5. The system of claim 1, wherein the capacity allocation module ensures that the allocated authorized capacity at all of the base stations is within the total authorized capacity.

6. The system of claim 1, wherein the first and second conditions comprise at least one of a time of day, a calendar day or a traffic load.

7. The system of claim 1, wherein the capacity allocation module uses a preselected authorization pattern that indicates the authorized capacity for each of the first and second conditions.

8. The system of claim 1, wherein the capacity allocation module increases an allocation of the total capacity for a first one of the base stations and decreases an allocation of the total capacity for a second one of the base stations.

9. The system of claim 1, wherein the capacity allocation module simultaneously allocates another portion of the total authorized capacity to another base station.

10. The system of claim 1, wherein the capacity allocation module automatically adjusts the allocation of the total authorized capacity among the plurality of base stations to provide enough capacity at each of the base stations to handle a current traffic load at each of the base stations.

11. The system of claim 1, wherein
expected traffic loads at the base stations are predetermined; and
the capacity allocation module allocates the total authorized capacity among each of the base stations in an amount that corresponds to the expected traffic load at each of the base stations.

* * * * *